(12) United States Patent
Ustinova et al.

(10) Patent No.: US 11,488,012 B2
(45) Date of Patent: Nov. 1, 2022

(54) TRAINING OF DEEP NEURAL NETWORKS ON THE BASIS OF DISTRIBUTIONS OF PAIRED SIMILARITY MEASURES

(71) Applicant: OBSCHESTVO S OGRANICHENNOY OTVETSTVENNOSTYU "VIZHNLABS", Moscow (RU)

(72) Inventors: Evgeniya Sergeevna Ustinova, Moscow (RU); Viktor Sergeevich Lempiczkij, Moscow (RU)

(73) Assignee: OBSCHESTVO S OGRANICHENNOY OTVETSTVENNOSTYU "VIZHNLABS", Moscow (RU)

( * ) Notice: Subject to any disclaimer, the term of this patent is extended or adjusted under 35 U.S.C. 154(b) by 714 days.

(21) Appl. No.: 16/473,724

(22) PCT Filed: Dec. 30, 2016

(86) PCT No.: PCT/RU2016/000954
§ 371 (c)(1),
(2) Date: Jun. 26, 2019

(87) PCT Pub. No.: WO2018/124918
PCT Pub. Date: Jul. 5, 2018

(65) Prior Publication Data
US 2020/0218971 A1 Jul. 9, 2020

(30) Foreign Application Priority Data
Dec. 27, 2016 (RU) ............................ RU2016151609

(51) Int. Cl.
*G06F 17/18* (2006.01)
*G06N 3/08* (2006.01)
*G06K 9/62* (2022.01)
*G06N 3/04* (2006.01)

(52) U.S. Cl.
CPC ............... *G06N 3/08* (2013.01); *G06F 17/18* (2013.01); *G06K 9/6215* (2013.01); *G06N 3/0472* (2013.01)

(58) Field of Classification Search
CPC ...................................................... G06F 17/18
See application file for complete search history.

(56) References Cited

U.S. PATENT DOCUMENTS

| | | | |
|---|---|---|---|
| 7,774,288 B2 * | 8/2010 | Acharya | G06F 16/285 |
| | | | 706/45 |
| 2015/0055855 A1 * | 2/2015 | Rodriguez | G06K 9/627 |
| | | | 382/155 |
| 2015/0186787 A1 * | 7/2015 | Kumar | G06Q 10/107 |
| | | | 707/758 |

OTHER PUBLICATIONS

He ("Pairwise Word Interaction Modeling with Deep Neural Networks for Semantic Similarity Measurement"), Jun. 12-17, 2016 (Year: 2016).*

(Continued)

*Primary Examiner* — Jae U Jeon
(74) *Attorney, Agent, or Firm* — Nixon & Vanderhye PC

(57) ABSTRACT

This technical solution generally refers to computing systems based on biological models, and specifically to ways of training deep neural networks based on distributions of the pairwise similarity measures. A way to train deep neural networks based on distributions of pairwise similarity measures, which produces a marked learning sample, where each element of the learning sample has a mark of the class to which it belongs; forms a set of non-crossing random subsets of the learning sample of input data for the deep neural network in such a way that they represent a learning sample when combined; transmits each formed subset of the learning sample to the input of the deep neural network resulting in a deep representation of this subset of the learning sample; determines all pairwise similarity measures between the deep representations of elements of each subset (Continued)

obtained at the previous stage; the similarity measures determined at the previous stage between the elements that have similar marks of classes are referred to the similarity measures of positive pairs, and the similarity measures between the elements that have different marks of classes are referred to the measures of negative pairs; determines the probability distribution of similarity measures for positive pairs and that for negative pairs through the use of histogram; forms the loss function on the basis of probability distributions of similarity measures for positive and negative pairs determined at the previous stage; minimizes the formed function at the previous stage of losses using the BPE technique. The technical result is an improved accuracy of learning and reduced time for setting up the training parameters of deep representation of input data.

10 Claims, 7 Drawing Sheets

(56) References Cited

OTHER PUBLICATIONS

Shibatay ("Byte pair encoding: a text compression scheme that accelerates pattern matching"), 1999 (Year: 1999).*

* cited by examiner

TRAINING OF DEEP NEURAL NETWORKS ON THE BASIS OF DISTRIBUTIONS OF PAIRED SIMILARITY MEASURES

This application is the U.S. national phase of International Application No. PCT/RU2016/000954 filed 30 Dec. 2016, which designated the U.S. and claims priority to RU Patent Application No. 2016151609 filed 27 Dec. 2016, the entire contents of each of which are hereby incorporated by reference.

TECHNICAL FIELD

This technical solution generally relates to computing systems based on biological models, and specifically to ways of teaching deep neural networks based on distributions of the pairwise similarity measures.

PRIOR ART

A deep learning concept refers to the recognition tasks and means an approach to teaching the so-called deep structures, which multi-level neural networks may be referred to. Just an example from the pattern recognition field: it is necessary to teach the computing system to distinguish more and more abstract features in terms of other abstract features, i.e. to determine the dependence between abstract qualities (features), such as the expression of the whole face, eyes and mouth, and, ultimately, the accumulation of colored pixels mathematically, on the basis of which it is possible, for example, to determine the sex, age of a person or how much he or she resembles another person.

Compared to classical machine learning, deep learning takes a step forward and precludes the necessity to formalize the knowledge of experts at the initial stage. All important regularities are determined by the system itself on the basis of the data entered (as it is the case e.g. in neural networks).

From the prior art, we know of the article written by S. Chopra, R. Hadsell, and Y. LeCun. Learning a similarity metric discriminatively, with application to face verification. 2005 IEEE Computer Society Conference on Computer Vision and Pattern Recognition (CVPR 2005), 20-26 Jun. 2005, San Diego, Calif., USA, pp. 539-546, 2005.

This technical solution uses the loss function for pairs of examples from training data in deep learning and calculates it independently. For pairs of training examples assigned to one and the same class (positive pairs), Euclidean distance between the vectors of their deep representations is minimized, and for pairs of examples of different classes (negative examples) is maximized until the distance between the positive examples is less than the distance between the negative examples by the margin value.

Such approach may cause problems with re-training. In addition, the choice of the margin value is not a trivial task since the distributions of distance values undergoes massive changes during the learning process.

There is also a well-known article written by Weinberger, Kilian Q., and Lawrence K. Saul. "Distance metric learning for large margin nearest neighbor classification." Journal of Machine Learning Research 10. February (2009): 207-244.

This technique uses the loss function for the triplet of examples from training data in deep learning and calculates it independently. The triplet consists of two pairs of examples, one of which is a positive (both examples belong to the same class) and the other one is negative (examples belong to different classes). In this way we are looking for such a representation able to obtain suitable relative distances between the examples in the positive and negative pairs—positive pairs should have smaller values. However, this technique assumes that you should set the margin value between the distances in the positive and negative pairs as well. On the one hand, this technique is quite flexible as the specific difference between the distances inside the positive and negative pairs for an example may vary depending on the location of its spatial representation.

However, it can also be a reason for re-training. Besides, choosing the triplets is not an easy task that sometimes requires massive computing resources.

TECHNICAL SOLUTION SUMMARY

This technical solution is designed to remove disadvantages inherent in solutions known from the prior art.

The technical problem solved in this technical solution is teaching of the deep neural network model.

The technical result manifesting itself when solving the above problem is increase in the teaching accuracy and reduction of time required to set up parameters for teaching of input data deep representations.

The above technical result is achieved through the implementation of the deep neural networks' teaching technique based on the distributions of pairwise similarity measures, which produces a marked learning sample, wherein each element of the learning sample has a mark of the class to which it belongs; forms a set of non-crossing random subsets of the learning sample of input data for the deep neural network in such a way that they represent a learning sample when combined; transmits each formed subset of the learning sample to the input of the deep neural network resulting in a deep representation of this subset of the learning sample; determines all pairwise similarity measures between the deep representation of elements of each subset obtained at the previous stage; the similarity measures determined at the previous stage between the elements that have similar marks of classes are referred to the similarity measures of positive pairs, and the similarity measures between the elements that have different marks of classes are referred to the similarity measures of negative pairs; determines the probability distribution of similarity measures values for positive pairs and for negative pairs through the use of histogram; forms the loss function on the basis of probability distributions of similarity measures for positive and negative pairs determined at the previous stage; minimizes the function formed at the previous stage of losses using the BPE technique.

In some embodiments, a marked learning sample is obtained from the data warehouse.

In some embodiments, the mark of class is numeric or symbolic.

In some embodiments, each formed subset of the learning sample is transmitted to the input of deep neural network in series or in parallel.

In some embodiments, a deep representation of the subset is a set of real numbers' vectors, each of which corresponds to the subset element.

In some embodiments, L2-normalization of the last layer in the deep neural network is performed before obtaining a deep representation of each subset of the learning sample.

In some embodiments, a cosine similarity measure is used when determining the similarity measures between deep representations of each subset elements.

In some embodiments, the probability distribution of similarity measures values is determined for both positive and negative pairs in a nonparametric way using linear interpolation of histogram bin values.

In some embodiments, the loss function, which is differentiable with respect to similarity pairs, is formed.

In some embodiments, the loss function is minimized on the basis of histograms using the BPE technique until the loss function value stops decreasing.

SHORT DESCRIPTION OF DRAWINGS

The features and benefits of this technical solution will be evident from the detailed description below and the drawings attached, on which:

FIG. 7a shows histograms of distributions when using the loss function proposed;

FIG. 7b shows histograms of distributions when using a binomial deviance using the structural similarity;

FIG. 7c shows histograms of distributions when using the structural similarity.

DETAILED DESCRIPTION

Figure 1:
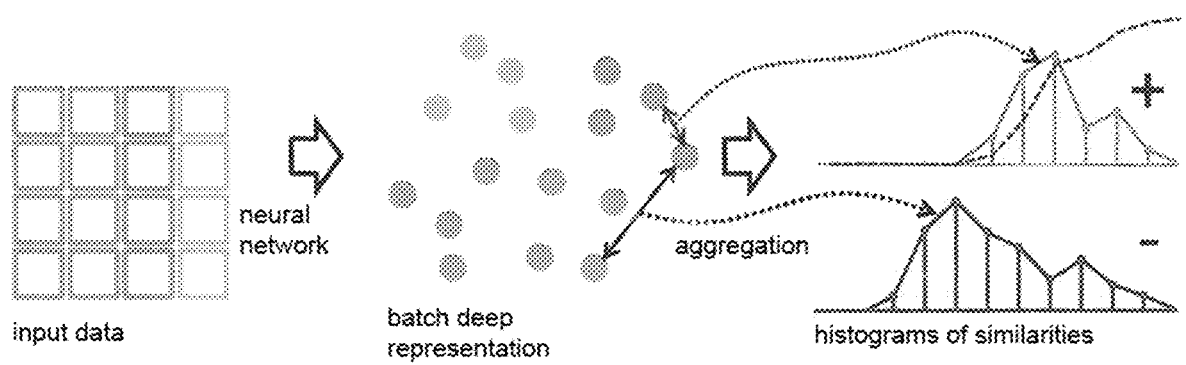
FIG. 1 shows an example of how to calculate the loss function on the basis of histograms.

The terms and definitions required for detailed disclosure of the technical solution to be implemented will be described below.

The technical solution can be implemented as a distributed computer system.

The system is referred to in this solution as a computer system, the computer (electronic data processing machine), CNC (computerized numerical control), PLC (programmable logic controller), computerized control systems and any other devices capable of performing a predetermined, clearly defined sequence of operations (actions, instructions).

An instruction processing unit shall mean an electronic unit or integrated circuit (microprocessor) executing machine instructions (programs).

The instruction processing unit reads and executes machine instructions (programs) from one or several data storages devices. Data storage devices may include, but not limited to, hard disk drives (HDDs), flash memory, ROM (read-only memory), solid state drives (SSD), optical media (CD, DVD, etc.).

The program is a sequence of instructions to be executed by the computer controller device or instruction processing unit.

Deep learning is a set of machine learning algorithms that try to simulate high-level abstractions in data using architectures consisting of multiple non-linear transformations.

In other words, deep learning is part of a wider family of machine learning techniques—learning through representations where vectors of attributes are arranged on multiple levels at the same time. These attributes are determined automatically and linked to each other to form the output data. Each level represents abstract attributes based on those of previous level. Thus, the deeper we move on, the higher the level of abstraction. In neural networks, multiple layers represent multiple levels with vectors of attributes generating the output data.

Sample is part of the general set of elements covered by an experiment (observation, survey).

Deep representation is a representation of the primary data in some space, which results from the trained model of deep neural network, when the primary data is given to its input.

Similarity measure is a real value, which shows how much the objects are similar to each other, for example, belong to the same semantic class.

Probability distribution is a law describing the range of a random value and probability of its outcome (appearance).

Histogram is a way of graphical representation of tabular data.

Loss function is a function, which characterizes losses in the theory of statistical solutions in the event of incorrect decision making based on observed data.

Margin is a distance from some point to the boundary of solution, which is used, for example, in the support vector machine. It can also be the difference between the distance between the representations of the same class and that of the different classes representations.

Threshold values are some reference values that allow to define the loss function in a parametric way.

Convolutional neural network (CNN) is a special architecture of artificial neural networks proposed by Jan Lekun and aimed at effective image recognition by considering the spatial correlation of images using convolutional filters with learned parameters of scales, is part of deep learning technologies.

Cosine similarity measure is a measure of similarity between two vectors of pre-Hilbert space, which is used to measure the cosine angle between them.

If two vectors of attributes, A and B, are given, the cosine measure of similarity $\cos(\theta)$ can be represented with the use of scalar product and norm:

$$\text{similarity} = \cos(\theta) = \frac{A \cdot B}{\|A\| \cdot \|B\|} = \frac{\sum_{i=1}^{n} A_i \times B_i}{\sqrt{\sum_{i=1}^{n} (A_i)^2 \times \sum_{i=1}^{n} (B_i)^2}}$$

The way to teach deep neural networks based on distributions of pairwise similarity measures can be implemented in some embodiments as follows.

Stage 101: a marked learning sample is obtained, where each element of the learning sample has a mark of the class to which it belongs;

The class is defined as the semantic class of the object (e.g. Petya's face or a dog's photo). Each element from the sample has its own class mark after the classification performed by human. The class mark can be both numeric and symbolic. For example, if the objects are a dog and a cat. In symbolic artificial intelligence, these are two different symbols that have no relationship to each other.

The learning sample is preliminarily formed and transferred to the data processing device where this technique is performed from the data warehouse.

Stage 102: a set of non-crossing random subsets of input learning sample is formed for a deep neural network in such a way that they represent a learning sample when combined;

At this stage, the entire learning sample is divided into random subsets. A set of non-crossing random subsets of input data learning sample may be represented as X={$x_1, x_2 \ldots x_n$}, and the deep neural network as f(·,θ), where θ are the learned neural network parameters, the scheme of which is given in FIG. 1. In some literature, a subset of the learning sample is referred to as a batch.

Stage 103: each formed subset of the learning sample is given to the input of the deep neural network, resulting in a deep representation of this subset of the learning sample;

In some embodiments, subsets of the learning sample may be transmitted both in series, and in parallel.

An example of a deep representation of the subset is a set of vectors of real numbers, each of which corresponds to the subset element.

The output layer in the deep neural network does not produce a classification result, but gives an n-dimensional vector of deep representations, where n is the number of neurons at the output of the deep neural network model. In some embodiments, L2-normalization of the last layer outputs of deep neural network is performed. L2-normalization (or regularization) is performed in order to reduce the degree of re-training of the model and preclude the scale parameter of deep representation values. Thus, the distance between representations is limited and the histogram can be set using only one parameter, for example, the width of the range. L2-normalization is performed by dividing the vector of deep representations into its L2-norm $\|x\|2 = \sqrt{\Sigma_i |x|_i^2}$, which is a geometric distance between two points in the multidimensional space, calculated e.g. in a two-dimensional space using the theorem of Pyphagoras. Some embodiments may use another normalization, which may be differentiated.

Stage 104: all pairwise similarity measures are determined between the deep representations of the elements of each subset obtained at the previous stage;

If $f_1, f_2, \ldots, f_n$ are deep representations obtained, the pairwise similarity measures $d_{i,j}$ will be determined as $d_{i,j}=D(f_i, f_j)$ (i and j may take any values from 0 to N), where D ($f_i, f_j$) is a measure of similarity between two vectors (e.g. cosine measure of similarity). The cosine measure of similarity D(x, y) between points $x=(x_1, x_2, \ldots, x_b)$ and $y=(y_1, y_2, \ldots, y_n)$ in the space of dimension n is determined as $$D(x, y) = \sqrt{\sum_{k=1}^{n} x_k y_k \bigg/ \left(\sum_{k=1}^{n} x_k^2 \sum_{k=1}^{n} y_k^2\right)}$$

If pairs are assigned to one and the same class, they are positive, but if pairs belong to different classes, they are negative.

Stage 105: the measures of similarity between elements having the same class marks, determined at the previous stage, are referred to the measures of similarity of positive pairs, and the measures of similarity between elements that have different class marks, are referred to the measures of similarity of negative pairs;

For example, when working with semantic classes of "dog" and "cat" images, the measure of similarity of deep representations of two dog or two cat images will refer to a positive pair, and the measure of similarity of deep representations of one dog and one cat image will refer to a negative pair.

Stage 106: the probability distribution of similarity measure values for positive pairs and the probability distribution of similarity measure values for negative pairs are determined using a histogram;

At this stage, two one-dimensional probability distributions of similarity measures are determined between examples in the space of their deep representations, one of which refers to the similarity measures of pairs of examples with the same marks (positive pairs), and the other—to the values of similarity measures of pairs of examples with different marks (negative pairs). These distributions are calculated in a nonparametric way by linear interpolation of histogram bin values. Assume $m_{ij}=1$, if $x_i$ and $x_j$ are the same object (positive pair), $m_{ij}=-1$ otherwise (negative pair). If we know {$m_{ij}$} and neural network outputs {$y_i=f(x_i;\theta)$}, it is possible to determine the probability distributions $p^+$ and $p^-$, which correspond to the measures of similarity between the positive and negative pairs, respectively. In particular, the values $S^+=(s_{ij}=(x_i, x_j)|m_{ij}=+1)$ и $S^-=(s_{ij}=(x_i, x_j)|m_{ij}=-1)$ may be considered as samples from these two distributions, where $s_{ij}=(x_i, x_j)$ is a pair of objects.

If we have samples $S^+$ and $S^-$, it is possible to use any known statistical approach to determine the $p^+$ and $p^-$ values. The unidimensionality of these distributions and limitation of values in the [−1; +1] range simplifies this task.

In some embodiments, it is possible to use histograms $H^+$ and $H^-$ of dimension R and with knots $t_1=-1, \ldots, t_R=-1$, uniformly spaced within the [−1;+1] range with Δ=2/(R−1) step. In each knot of $H^+$ histogram, it is possible to determine its value hr:

$$h_r^+ = \frac{1}{|S^+|} \sum_{(i,j): m_{ij}=+1} \delta_{i,j,r},$$

where (i,j) designates all positive examples in the subset of the learning sample. Scales $\delta_{i,j}$ are selected as follows (where r is the number of histogram knot):

$$\delta_{i,j,r} = \begin{cases} \frac{s_{i,j} - t_{r-1}}{\Delta}, & s_{i,j} \in [t_{r-1}, t_r] \\ \frac{t_{r+1} - s_{i,j}}{\Delta}, & s_{i,j} \in [t_r, t_{r+1}] \\ 0, & \text{otherwise} \end{cases}$$

Thus, the linear interpolation is used for each pair. The values of histogram $H^-$ are determined in the same way.

If we have estimates for distributions $p^+$ and $p^-$, we evaluate the probability that the measure of similarity between two examples in the random negative pair is greater than that between two examples in the random positive pair (inverse probability) as follows:

$$P_{\infty p}^l \int_{-1}^{1} p^-(x) \left[ \int_{-1}^{1} p^+(y) dy \right] dx = \int_{-1}^{1} p^-(x) \Phi^+(x) dx = E_{x \sim p^-}[\Phi^+(x)]$$

where $\Phi^+(x)$ is a cumulative density of probability from $p^+(x)$. This integral can be approximated and calculated as:

$$L(X, \theta) = \sum_{r=1}^{R} \left( h_r^- \sum_{q=1}^{r} h_q^+ \right) = \sum_{r=1}^{R} h_r^- \phi_r^+,$$

where L is the proposed loss function on the basis of histograms calculated by the subset of sample X using θ network output parameters, whereby the loss function approximates the inverse probability.

$$\phi_r^- = \sum_{q=1}^{r} h_q^+,$$

is a cumulative sum of H+ histogram.

Stage 107: The loss function is formed on the basis of probability distributions of similarity measures for positive and negative pairs determined at the previous stage;

The loss function proposed is differentiable with respect to pairwise similarities s e S$^+$ and s e S$^-$:

$$\frac{\partial L}{\partial h_r^-} = \sum_{q=1}^{r} h_q^+,$$

$$\frac{\partial L}{\partial h_r^+} = \sum_{q=r}^{R} h_q^-,$$

$$\frac{\partial h_r^+}{\partial s_{ij}} = \begin{cases} \frac{1}{\Delta |S^+|}, & S_{ij} \in [t_{r-1}, t_r] \\ \frac{-1}{\Delta |S^+|}, & S_{ij} \in [t_r, t_{r+1}] \\ 0, \end{cases}$$

for any $s_{ij}$ in such a way that $m_{ij}$=+1 (similar to $\partial h_r^-/\partial s_{ij}$). Also, $$\frac{\partial s_{ij}}{\partial x_i} = x_j,$$

$$\frac{\partial s_{ij}}{\partial x_j} = x_i,$$

Stage 108: the loss function formed at the previous stage is minimized on the basis of histograms using the BPE technique [1].

With a direct pass, the random subset of the input data learning sample X={$x_1, x_2, \ldots, x_N$} is given to the deep neural network input, then its successive transformations are performed in the layers of deep neural network, which are determined by its parameters. The result is a set of deep representations of primary data that is given to the input of the loss function proposed along with the marks of classes corresponding to the sample elements. This input data is used to calculate the value of loss function (error) and to perform the back propagation of the error to the outputs of deep neural network according to the formulas given at stages 107 to 108. The error then spreads back from the output to the input of deep neural network though its layers, whereby the parameters of deep neural network layers are updated to minimize this error. Afterwards, a similar processing of the next random subset of input data learning sample is performed. The process is repeated until the error (loss function values) stops decreasing.

Embodiments

To implement this technical solution, experimental comparisons of the proposed loss function of this technical solution were performed on the basis of a histogram with the function of Binomial Deviance loss [2], Lifted Structured Similarity Softmax loss[3], contrast function of loss [7] and function of loss on the basis of triplets [8]. Modelling was done with the help of the Caffe deep learning library. Comparison was made for the tasks of searching similar things by their images on the basis of Online products dataset [3], classification of bird species by their photos on the basis of CUB-200-2011 [4], re-detection of objects (re-identification) based on CHUNK03 [5] and Market-1501 [6]. In experiments with Online products and CUB-200-2011 databases, the same architecture of the GoogLeNet neural network was used, using the attributes of the fifth layer of pooling (pooling is a spatial multiplex of activations of the previous layer outputs). In experiments based on CHUNK03 and Market-1501, the architecture of deep learning of metrics, consisting of three neural networks for the lower, middle and upper parts of the human image, was used.

On the example of this embodiment, we will consider the implementation of this method in more detail. Input images come in RGB format in the form of three-dimensional matrices I in such a way that the pixel with i and j coordinates has the value of R component equal to $I_{i,j,1}$, the value of G component is equal to $I_{i,j,2}$, and the value of B–$I_{i,j,2}$, i.e. the first two dimensions in this matrix are responsible for geometric coordinates, and the third—for the color coordinate. Using bilinear interpolation by geometric coordinates, this matrix is reduced to a size of 128 pixels in height and 48 pixels in width. Three sub-matrices are extracted from the obtained matrix in such a way that the new matrices have the same height and width equal to 48 pixels, and the vertical coordinates of the upper boundaries of the obtained matrices are equal to 1, 41 and 81, respectively. Each of the sub-matrices obtained is given to the input of the first layer of the deep neural network for this part (each part has its own neural network for learning), whereby the layer is convolutional and has a convolution core of 7×7×64 in size, so for each sub-matrix a map of attributes (three-dimensional matrix) of 48×48×64 in size is generated at the output. Next, we will see what will happen in each deep neural network. For the map of attributes obtained, a spatial pooling is performed with the step equal to 2 pixels, the result is a map of attributes of 24×24×64 in size. A non-linear transformation of the attribute map is performed, which resets all negative values to zero. The obtained result is applied to the input of the convolution layer of deep the neural network with a convolution core of 5×5×64 in size, the result is a map of attributes of 24×24×64 in size and a pooling with the step of 2. This results in a map of attributes of 12×12×64 in size. Thus, we obtained three maps of attributes from each neural network. These maps are combined into a single vector of deep representation of the original image with the length of 500 elements using a fully connected layer, in which each element of the output vector is linked to each element of the map of attributes of each part. Subsequently, L2-normalization is performed. The obtained deep representations of input images along with the marks of classes are used to determine the measures of similarity for all possible pairs through the calculation of a cosine measure of similarity between deep representations, then the probability distributions of similarity measures of positive and negative pairs are formed on the basis of marks of classes using histograms. The obtained distributions are used to calculate the loss function proposed, then the back propagation of the derived loss is performed to adjust the neural network parameters. The process of deep neural network learning at all bases differed only by the loss function selected. The learning with a binomial loss function was performed with two values of losses for negative pairs: c=10 and c=25.

Figure 2:
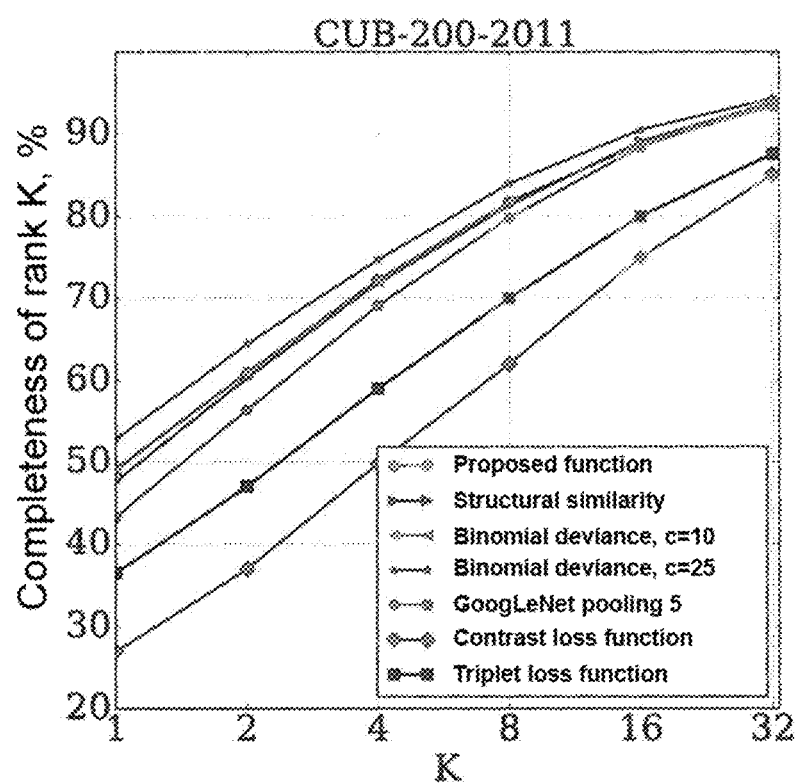
FIG. 2 shows the completeness of rank K of different methods on the basis of CUB-200-2011.
Figure 3:
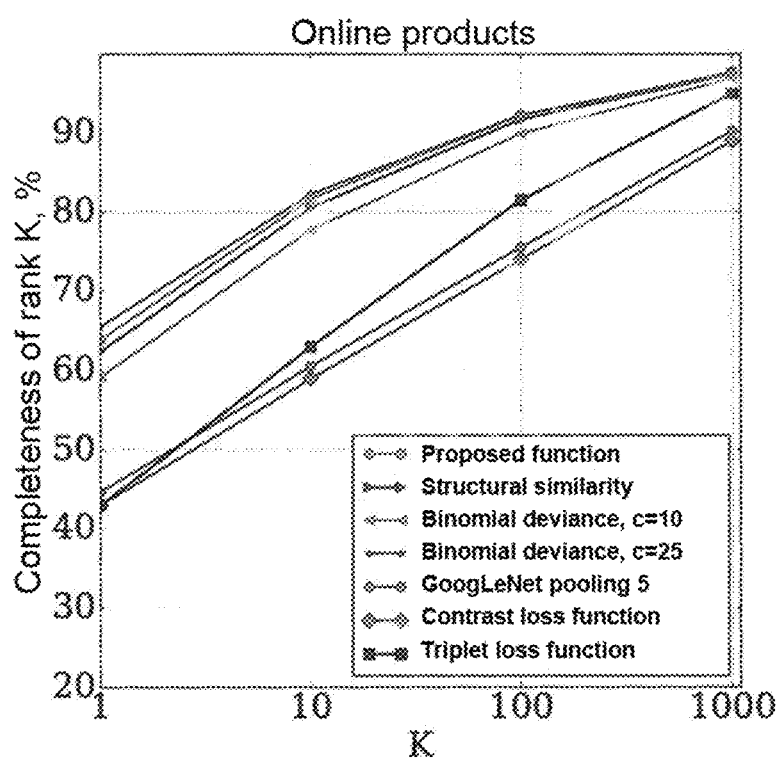
FIG. 3 shows the completeness of rank K of different methods on the basis of online products.
Figure 4:
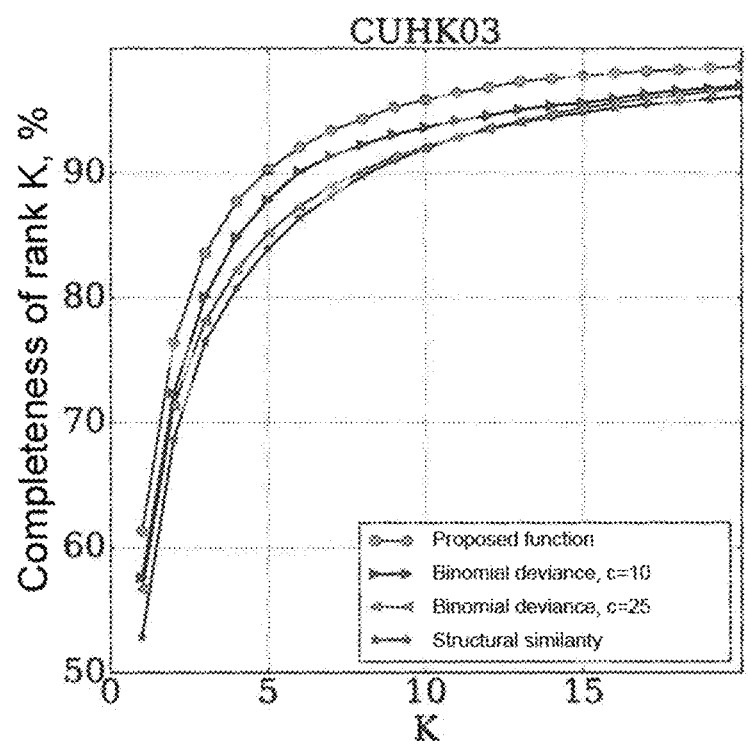
FIG. 4 shows the completeness of rank K of different methods on the basis of CUHK03.
Figure 5:
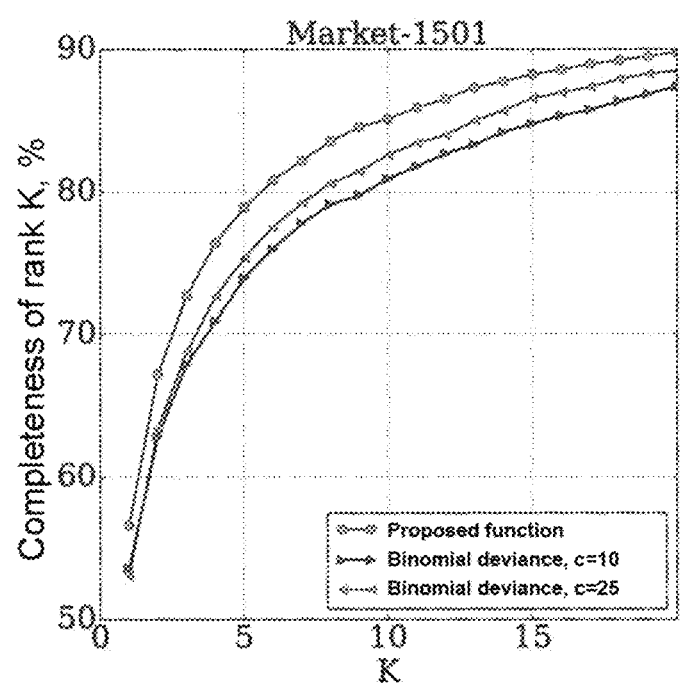
FIG. 5 shows the completeness of rank K of different methods on the basis of Market-1501.
Figure 6:
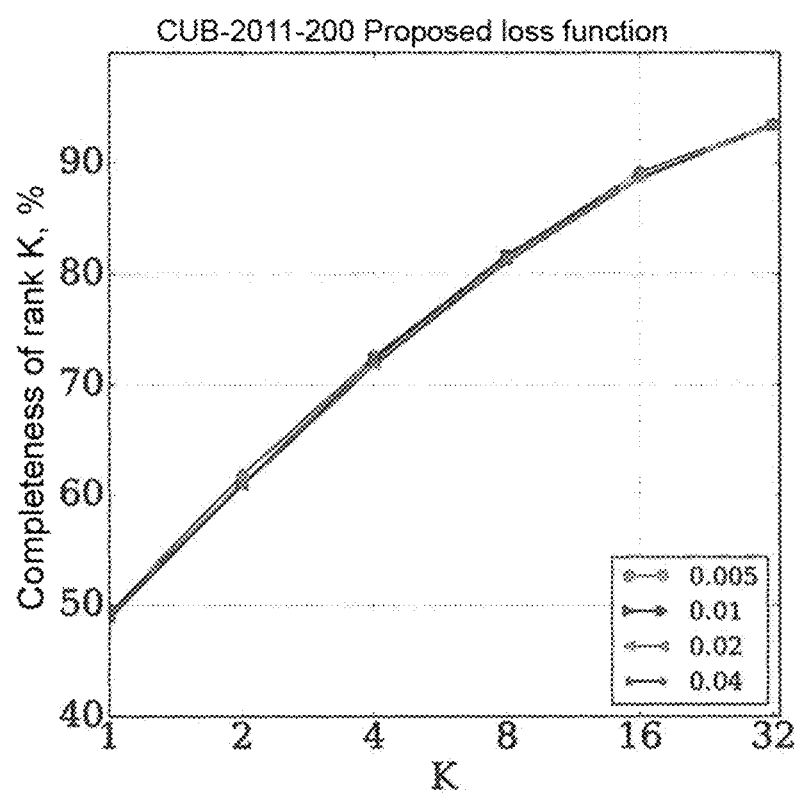
FIG. 6 shows the completeness of rank K of different methods on the basis of CUB-2011-200 when using different histogram bin sizes in the loss function proposed.
Figure 7A:
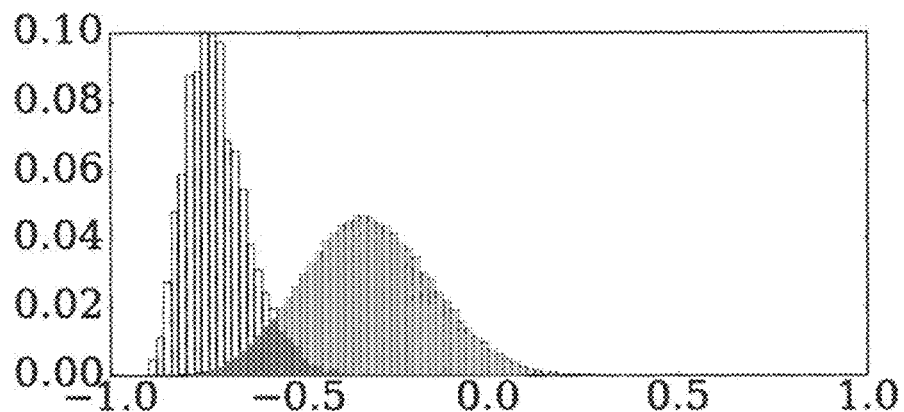
FIGS. 7a-7c show histograms comprising distributions of similarities of positive pairs (white color) and negative pairs (grey color) when using different loss functions.
Figure 7B:
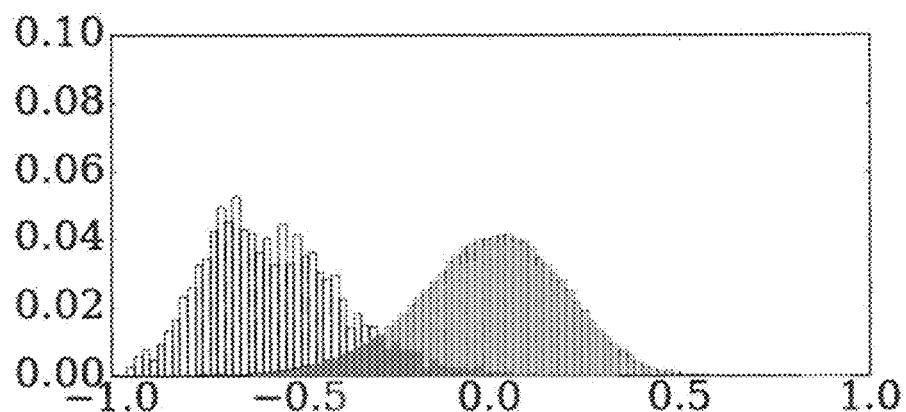
Figure 7C:
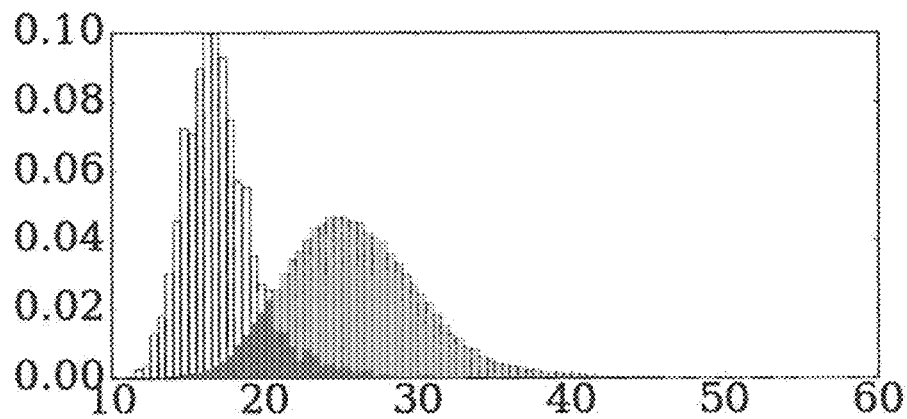

Results of completeness factor of rank K (Recall@K) are given in FIG. 2 for the base CUB-200-2011, in FIG. 3 for the base Online products, in FIG. 4 for the base CHUNK03, and in FIG. 5 for the base Market-1501. From the diagram for the bases CUB— 200-2011 and Online products, it is clear that the loss function proposed is slightly inferior to the loss function based on a binomial deviance, but superior to other loss functions. For the bases CHUNK03 and Market-1501, the proposed loss function allows achieving the best result. With the base CUB-200-211 an experiment was held to evaluate the influence of the histogram bin value on the final accuracy, the result of which is shown in FIG. 6. From this diagram we can see that the selection of histogram bin size in the proposed loss function does not exert any influence on the accuracy of the obtained model. FIG. 5 shows histograms of distributions of similarities of positive pairs (white color) and negative pairs (grey color) with the base CHUNK03 when using the proposed loss function on the basis of histograms (Pos. 1), binomial deviance (Pos. 2) and structural similarity (Pos. 3). From these diagrams we can see that the proposed loss function provides the smallest intersection between the distributions of similarities of positive and negative pairs, which clearly shows that the declared technical result has been achieved.

LIST OF REFERENCES

1. Rumelhart D. E., Hinton G. E., Williams R. J., Learning Internal Representations by Error Propagation. In: Parallel Distributed Processing, vol. 1, pp. 318-362. Cambridge, Mass., MIT Press. 1986.
2. Yi, Dong, Zhen Lei, and Stan Z. Li. "Deep metric learning for practical person re-identification." arXiv preprint arXiv: 1407.4979 (2014).
3. H. O. Song, Y. Xiang, S. Jegelka, and S. Savarese. Deep metric learning via lifted structured feature embedding. Computer Vision and Pattern Recognition (CVPR), 2016.
4. C. Wah, S. Branson, P. Welinder, P. Perona, and S. Belongie. The Caltech-UCSD Birds-200-2011 Dataset. (CNS-TR-2011-001), 2011.
5. W. Li, R. Zhao, T. Xiao, and X. Wang. Deepreid: Deep filter pairing neural network for person re-identification. 2014 IEEE Conference on Computer Vision and Pattern Recognition, CVPR 2014, Columbus, Ohio, USA, Jun. 23-28, 2014, pp. 152-159, 2014.
6. L. Zheng, L. Shen, L. Tian, S. Wang, J. Wang, and Q. Tian. Scalable person re-identification: A benchmark. Computer Vision, IEEE International Conference on, 2015.
7. S. Chopra, R. Hadsell, and Y. LeCun. Learning a similarity metric discriminatively, with application to face verification. 2005 IEEE Computer Society Conference on Computer Vision and Pattern Recognition (CVPR 2005), 20-26 Jun. 2005, San Diego, Calif., USA, pp. 539-546, 2005.
8. Weinberger, Kilian Q., and Lawrence K. Saul. "Distance metric learning for large margin nearest neighbor classification." Journal of Machine Learning Research 10. Feb. (2009): 207-244.

The invention claimed is:

1. A method of teaching of deep neural networks on the basis of distributions of pairwise similarity measures, including the following stages:
   a marked learning sample is obtained, where each element of the learning sample has a mark of the class to which it belongs;
   a set of non-crossing random subsets of input data learning sample is formed for a deep neural network in such a way that they represent a learning sample when combined;
   each formed subset of the learning sample is given to the input of the deep neural network which results in a deep representation of this subset of the learning sample;
   all pairwise measures of similarity between deep representations of elements of each subset obtained at the previous stage are determined;
   measures of similarity between elements that have the same class marks, determined at the previous stage, are referred to the measures of similarity of positive pairs, and the measures of similarity between elements that have different class marks, are referred to the measures of similarity of negative pairs;
   the probability distribution of similarity measures for positive pairs and the probability distribution of similarity measures for negative pairs are determined using a histogram;
   the loss function is formed on the basis of probability distributions of similarity measures for positive and negative pairs determined at the previous stage;
   the loss function formed at the previous stage is minimized using the BPE technique.

2. The method specified in claim 1, wherein a marked learning sample is obtained from the data warehouse.

3. The method specified in claim 1, wherein a class mark is numeric or symbolic.

4. The method specified in claim 1, wherein each formed subset of the learning sample is transmitted to the input of deep neural network in series or in parallel.

5. The method specified in claim 1, wherein a deep representation of the subset is a set of vectors of real numbers, each of which corresponds to the subset element.

6. The method specified in claim 1, wherein the fact that L2-normalization of the last layer of the deep neural network is performed before obtaining a deep representation of each subset of the learning sample.

7. The method specified in claim 1, wherein a cosine similarity measure is used when determining the similarity measures between deep representations of each subset elements.

8. The method specified in claim 1, wherein the probability distribution of similarity measures is determined for both positive and negative pairs in a nonparametric way using linear interpolation of histogram bin values.

9. The method specified in claim 1, wherein the loss function, which is differentiable with respect to pairwise similarities, is formed.

10. The method specified in claim 1, wherein the loss function is minimized on the basis of histograms using the BPE technique until the loss function value stops decreasing.

* * * * *